United States Patent [19]

Frey

[11] Patent Number: 4,796,679

[45] Date of Patent: Jan. 10, 1989

[54] APPARATUS FOR DISPENSING A DEFORMABLE AND FLOWABLE FILLING MATERIAL

[76] Inventor: Albert Frey, Fischerstr. 21, 7922 Herbrechtingen, Fed. Rep. of Germany

[21] Appl. No.: 5,636

[22] Filed: Jan. 21, 1987

[30] Foreign Application Priority Data

Feb. 24, 1986 [DE]  Fed. Rep. of Germany ....... 3605896

[51] Int. Cl.4 .................... A22C 11/06; B65B 3/12
[52] U.S. Cl. ........................ 141/258; 17/35; 222/256; 141/59
[58] Field of Search ............... 141/84, 250–284, 141/357, 249, 59, 60; 222/252, 256, 262, 263, 386; 17/39, 35, 36

[56] References Cited

U.S. PATENT DOCUMENTS

| | | | |
|---|---|---|---|
| 2,545,319 | 3/1951 | Sundholm | 222/256 |
| 3,034,171 | 5/1962 | Rosenthaler | 17/35 |
| 3,108,319 | 10/1963 | Thompson . | |
| 3,161,910 | 12/1964 | Hughes | 17/39 |
| 3,166,786 | 1/1965 | Thompson . | |
| 3,189,940 | 6/1965 | Hughes | 17/39 |
| 3,334,674 | 8/1967 | Hughes . | |
| 3,537,129 | 11/1970 | Orloff et al. | 17/35 |
| 3,563,168 | 2/1971 | Doninger | 141/249 X |
| 3,601,845 | 8/1971 | Mavrich | 17/38 |
| 3,733,653 | 5/1973 | Javaloy et al. | 17/35 |
| 4,617,701 | 10/1986 | Frey | 17/45 |
| 4,641,691 | 2/1987 | Corominas | 141/59 X |

FOREIGN PATENT DOCUMENTS

| | | |
|---|---|---|
| 1050681 | 2/1959 | Fed. Rep. of Germany . |
| 1289760 | 2/1969 | Fed. Rep. of Germany .......... 17/38 |
| 2746667 | 5/1978 | Fed. Rep. of Germany .......... 17/38 |
| 3325300 | 2/1984 | Fed. Rep. of Germany .......... 17/38 |
| 1222221 | 1/1960 | France ..................... 17/38 |
| 1350069 | 12/1963 | France . |
| 2274223 | 1/1976 | France . |
| 862285 | 3/1961 | United Kingdom . |

Primary Examiner—Henry J. Recla
Assistant Examiner—Ernest G. Cusick
Attorney, Agent, or Firm—Merchant, Gould, Smith, Edell, Welter & Schmidt

[57] ABSTRACT

A residual quantity filler is described in which a cylindrical filling tube is used in place of a filling funnel, with a lid arrangement being provided in the filling tube and with the lid arrangement moving during the dispensing step with the dispensed material as a result of the differential pressure between the atmosphere and the vacuum prevailing at inside the filling tube, thus ensuring that the entire residual quantity can be continuously and completely processed.

7 Claims, 1 Drawing Sheet

U.S. Patent  Jan. 10, 1989  4,796,679
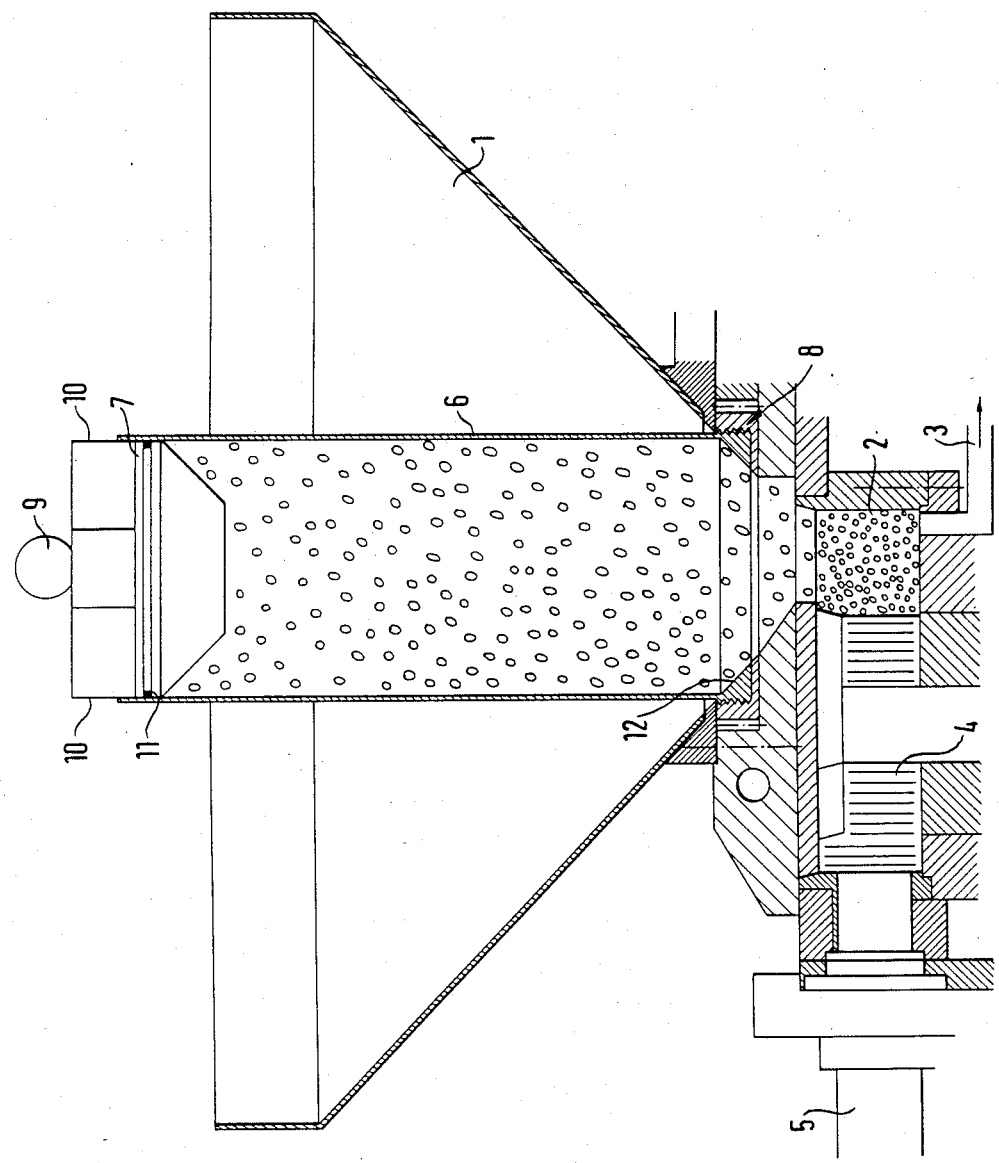

APPARATUS FOR DISPENSING A DEFORMABLE AND FLOWABLE FILLING MATERIAL

BACKGROUND OF THE INVENTION

The invention relates to an apparatus for dispensing a deformable and flowable filling material, in particular residual quantities of sausage meat, the apparatus comprising a filling funnel and also a filling chamber which follows the outlet of the filling funnel and can be connected to a vacuum source, with the filling material being dispensed in predetermined quantities by means of a portioning device.

An apparatus of this kind is for example known from German laying open print DE-OS No. 34 06 605 (corresponding to U.S. Pat. No. 4,617,701, Japanese application No. 59-107 367, European application No. 84 105 715) Such apparatus is suitable for filling containers, tubes, guts and the like with pasty material with both continuously and also discontinuously charged embodiments of such apparatus being used.

It is the aim in all types of this apparatus to remove the air contained in the particular filling material as completely as possibly because air inclusions can lead to a deterioration in the quality of the material to be dispensed, and are thus very undesirable. For this reason known machines operate with vacuum and attempt to remove surface and interstitial air.

In all apparatus which operates with a filling funnel and a conveyor-stirrer which rotates in this filling funnel difficulties occur in the further processing and/or transport of the filling material when the residual quantity present in the funnel in a particular case is so small that a throughgoing opening forms in the filling material or finely chopped meat so that the vacuum that is applied can no longer act to draw in the material.

In this case the rotating stirrer continues to rotate, it is however not able to transport the remainder of the filling material into the filling chamber. In this case the apparatus must then be stopped and the remainder of the filling material must then as a rule be pushed down into the filling chamber by hand.

This is particularly disturbing when, as often occurs in practice, relatively small quantities of sausage meat of different kinds have to be processed one after the other. In these cases there is not only the disadvantage that the automatic filling process no longer functions after a relatively short time but it is also unfavorable that as a rule the entire machine, and above all the stirrer, have to be cleaned, which is relatively involved, before the next actual portion can be processed. If for example, strongly colored sausage meat and a white sausage filling have to be processed one after the other then particularly stringent requirements must be placed on the cleaning operation and this can only be satisfied with a corresponding expenditure of time.

The principal object underlying the invention is to develop an apparatus of the kind initially set forth in such a way that smaller quantities of filling material can also be completely processed, practically fully automatically, in a technically particularly simple manner which can be realised with a minimum of effort and expense, and such that manual intervention during the filling process is precluded and the effort required in cleaning on changing from one sausage meat to the next is substantially reduced.

This object is satisfied in accordance with the invention essentially in that a cylindrical filling tube is coaxially insertable in sealed manner into the filling funnel; and in that a lid arrangement is provided in the filling tube, is sealingly guided at the inner wall of the filling tube and forms a wandering terminal wall.

By using a cylindrical filling tube the filling volume can in the first instance be substantially reduced in comparison to the funnel, which is of advantage, particularly having regard to the residual quantities which have to be processed. The decisive feature is however the exploitation of the applied vacuum to move the lid arrangement which is sealingly guided in the filling tube. As, namely, the filling material is drawn downwardly by the vacuum, the lid arrangement moves in the same manner with it, with the lid arrangement scraping the filling material from the wall of the filling tube and ensuring that no collapse of the vacuum can occur as a result of an opening to the atmosphere forming. On the contrary the co-migrating lid arrangement ensures that the entire residual quantity is transferred into the filling chamber and accordingly there is no need for the material to be pushed on by hand Consequently the safety of the overall apparatus is increased because it is no longer possible to reach, when working without due care, into the portioning device consisting for example of a vane cell pump or screw pump.

In order to be able to simply remove the lid arrangement from the filling tube after the filling process has been completed the lid arrangement is preferably provided with a manually actuatable aeration or vent valve.

As, in many known types of apparatus of this kin a stirrer is provided which can be screwed into the respective filling funnel the filling tube is in such cases preferably so constructed that it can be screwed into the thread provided for the stirrer—after removal of the stirrer. Should the filling tube then rotate, in operation in correspondence with the stirrer which is otherwise provided, then this is not disadvantageous.

This solution is also of advantage because it makes it possible to retrofit existing machines in accordance with the present invention, and makes it possible for residual quantities to be processed in troublefree manner using these existing machines.

In accordance with a further advantageous embodiment of the invention the sealing part of the lid arrangement is shaped, at its inner side, so that it is at least substantially complementary to the shape of the transition space between the filling funnel and the filling chamber, whereby full transfer of the filling material into the filling chamber is necessarily ensured.

Further advantageous forms of the invention are set forth in the subordinate claims.

BRIEF DESCRIPTION OF THE DRAWING

The single FIGURE shows a sectional plan view of an embodiment of the present invention.

DETAILED DESCRIPTION OF THE PREFERRED EMBODIMENTS

An embodiment of the invention will be explained in the following with reference to the drawing, the single FIGURE of which shows a schematic partial sectional representation of an apparatus in accordance with the invention.

As seen in the drawing there is provided a filling funnel of customary construction via which the particular filling material is transported to a filling chamber 2 which is subjected to a vacuum because it is connected to a vacuum, pump via a connection line 3.

The particular filling material is conveyed out of the filling chamber 2 by means of a portioning device 4 which can be a vane-cell pump, a screw pump, a piston arrangement or the like, to a filling tube 5.

In normal operation of the previously described apparatus a stirrer, which is not shown in the drawing is arranged in the filling funnel 1 to ensure that the filling material is continuously supplied to the filling chamber 2.

In accordance with the invention a cylindrical filling tube 6 is screwed into the threaded mount 8 which is provided for the stirrer This filling tube 6 serves to accommodate comparatively small quantities or residual quantities of sausage meat.

A lid or cover arrangement 7 is provided in the filling tube and forms a terminal wall which moves with the sausage meat during the dispensing process. This cover arrangement 7 is also provided with an integrated valve 9 which makes it possible to aerate the inner chamber of the filling tube 6 at the end of the filling step in order to make it possible in this way to remove the lid arrangement 7.

The lid arrangement 7 is sealed relative to the inner wall of the filling tube 6 and is provided with guide means in the form of a plurality of guide vanes having adequately long guide surfaces 10 at its outer side or end in order to ensure tilt-free displacement of the lid arrangement in the tube 6. It is also provided with an "0" ring seal 11 at its inner side or end so that a vacuum seal is formed at the inner wall of the filling tube.

When, in operation of the apparatus, the sausage meat is drawn downwardly by the applied vacuum then the lid arrangement 7 moves with it, because of the action on the lid of the differential pressure between vacuum and atmosphere which prevail at the inner side and the outer side of the lid respectively. The contour of the lid arrangement 7 on the filling chamber side is preferably of complementary shape to the transition region 12 between the filling funnel and the filling chamber, i.e. in this way a practically complete transfer of the sausage meat from the filling tube 6 into the filling chamber 2 is ensured.

The cleaning of the arrangement of the invention is extremely simple, and can also be carried out rapidly, which is a substantial advantage if small quantities of different materials have to be processed one after the other.

Furthermore, it is of substantial importance that the precise rest quantity within the filling tube 6 can be very precisely defined and one can thereby define precise change-over times by an eventual computer control.

It is likewise possible to retroequip existing machines because in existing machines the respective stirrers can be unscrewed and filling tubes in accordance with the invention can be inserted into the corresponding threaded mount.

I claim:

1. Apparatus for dispensing a deformable and flowable comprising: a filling funnel having a top end and a base end; a filling chamber disposed beneath said filling funnel; an outlet at said base end of said filling funnel; means for subjecting said filling chamber to a vacuum to draw said filling material downwardly from said filling funnel into said filling chamber; a dispensing tube communicating with said filling chamber for the dispensing of said filling material from said filling chamber; and a cylindrical filling tube having top and bottom ends, wherein said bottom end is coaxially insertable into said filling funnel above and in communication with said outlet, and wherein a lid is provided within said cylindrical filling tube, there being means for guiding said lid for axial movement within said cylindrical filling tube from said top end thereof to said bottom end, said lid thereby forming a wandering terminal wall of said filling tube, whereby said cylindrical filling tube is adapted for the transfer of residual quantities of said filling material through said outlet into said filling chamber under the influence of said means for subjecting the filling chamber to a vacuum.

2. Apparatus in accordance with claim 1, wherein the lid is sealed at the inner wall of the filling tube via at least one O-ring.

3. Apparatus in accordance with claim 2, wherein the lid comprises an inner side sealing part and an outer side guide part forming said means for guiding.

4. Apparatus in accordance with claim 3, wherein the guide part includes a plurality of guide vanes connected to the sealing part.

5. Apparatus in accordance with claim 3, wherein the sealing part of the lid has an inner side wherein a transistion space is present between said filling funnel and said filling chamber, and wherein the sealing part of the lid is shaped at its inner side so that it is substantially complementary in shape to the transition space between the filling funnel and the filling chamber.

6. Apparatus in accordance with claim 1 wherein a manually actuated aeration valve provided in the lid.

7. Apparatus in accordance with claim 1, wherein the filling tube has a base and a thread at said base and can be screwed inside the filling funnel in its like thread provided at the base of the filling funnel.

* * * * *

UNITED STATES PATENT AND TRADEMARK OFFICE
CERTIFICATE OF CORRECTION

PATENT NO. : 4,796,679
DATED : 10 January 1989
INVENTOR(S) : Albert Frey

It is certified that error appears in the above-identified patent and that said Letters Patent is hereby corrected as shown below:

Column 2, line 31, "kin" should be --kind--;

Claim 1, line 2, before "comprising", insert --filling material in the form of ground meat, the apparatus--.

Signed and Sealed this

Twenty-sixth Day of September, 1989

*Attest:*

DONALD J. QUIGG

*Attesting Officer*  *Commissioner of Patents and Trademarks*